United States Patent
Yu et al.

(10) Patent No.: US 7,656,319 B2
(45) Date of Patent: Feb. 2, 2010

(54) CONTEXT-BASED ENCODING AND DECODING OF SIGNALS

(75) Inventors: Rongshan Yu, Singapore (SG); Xiao Lin, Singapore (SG); Susanto Rahardja, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 240 days.

(21) Appl. No.: 11/632,486

(22) PCT Filed: Jul. 14, 2004

(86) PCT No.: PCT/SG2004/000211

§ 371 (c)(1),
(2), (4) Date: Nov. 20, 2007

(87) PCT Pub. No.: WO2006/006936

PCT Pub. Date: Jan. 19, 2006

(65) Prior Publication Data

US 2008/0094259 A1    Apr. 24, 2008

(51) Int. Cl.
*H03M 5/00* (2006.01)
(52) U.S. Cl. .............. 341/52; 341/51; 341/65; 341/67; 341/107; 382/232; 382/236; 382/240; 382/248
(58) Field of Classification Search .......... 341/51, 341/52, 65, 67, 107; 382/232, 236, 240, 382/248
See application file for complete search history.

(56) References Cited

U.S. PATENT DOCUMENTS

| 6,263,109 | B1 * | 7/2001 | Ordentlich et al. | 382/232 |
| 6,330,666 | B1 * | 12/2001 | Wise et al. | 712/300 |
| 6,466,698 | B1 * | 10/2002 | Creusere | 382/240 |
| 6,570,510 | B2 * | 5/2003 | Chen et al. | 341/51 |

(Continued)

FOREIGN PATENT DOCUMENTS

EP    1059812    5/2000

(Continued)

OTHER PUBLICATIONS

K. Sayood, *Introduction to Data Compression*, Ch. 1, pp. 19-21, Morgan Kaufmann, 2000.

(Continued)

*Primary Examiner*—Linh V Nguyen
(74) *Attorney, Agent, or Firm*—Paul J. Backofen, Esq.; Crockett & Crockett (57) ABSTRACT

A system for the context-based for the context-based encoding of an input signal includes a domain transform module and a context-based coding module. The domain transform module is operable to convert the input signal into a sequence of transform coefficients c[i]. The context-based coding module includes a bit-plane scanning module, and context modeling module, and a statistical encoding module. The bit-plane scanning module is operable to produce a bit-plane symbol bps [i,bp] for each transform coefficient c[i] and each bit-plane [bp]. The context modeling module is operable to assign one or more context values to each of the received bit plane symbols bps [i,bp]. The statistical coding module is operable to code each of the bit plane symbols bps [i,bp] as a function of one or more of the corresponding context values to produce a context-based encoded symbol stream.

45 Claims, 9 Drawing Sheets

U.S. PATENT DOCUMENTS

| | | | |
|---|---|---|---|
| 6,625,321 B1 * | 9/2003 | Li et al. | 382/239 |
| 6,646,578 B1 | 11/2003 | Au | 341/67 |
| 6,996,281 B2 * | 2/2006 | Boliek et al. | 382/236 |
| 7,062,103 B2 * | 6/2006 | Schwartz | 382/251 |
| 7,142,722 B2 * | 11/2006 | Fukuhara et al. | 382/240 |
| 7,397,963 B2 * | 7/2008 | Schwartz | 382/248 |
| 2001/0021223 A1 * | 9/2001 | Andrew | 375/240.11 |
| 2002/0027516 A1 * | 3/2002 | Yip | 341/107 |
| 2002/0084921 A1 * | 7/2002 | Chen et al. | 341/50 |
| 2008/0131014 A1 * | 6/2008 | Lee et al. | 382/251 |

FOREIGN PATENT DOCUMENTS

| | | |
|---|---|---|
| EP | 1107608 | 11/2000 |
| WO | WO 03/027940 | 9/2002 |

OTHER PUBLICATIONS

A. Said and W.A. Pearlman, *A New, Fast, and Efficient Image Codec Based on Set Partitioning in Heirarchical Trees*, IEEE Transactions on circuits and Suystems for video Technology, vol. 6, No. 3, pp. 243-250, Jun. 1996.

D. Taubman, *High Performance zScalable Image Compression with EBCOT*, IEEE Transactions on Image Processing, vol. 9, No. 7, pp. 1158-1170, Jul. 2000.

S.H. Park, Y.B. Kim and Y.S. Seo, *Multi-Layer Bit-Sliced Bit-Rate Scalable Audio Coder*, $103^{rd}$ AES Convention Preprint 4520, 1997.

R.Yu, X. Lin, S. Rahardja,and C.C. Ko, *A Scalable Lossy to Lossless Audio Coder for MPEG-4 Audio Scalable Lossless Coding*, Proc. ICASSP 2004.

Yu et al., *Proposed Core Experiment for Improving Coding Efficiency in MPEG-4 Audio Scalable Coding (SLS)*, ISO/IEC MPEG2004/M10683, Mar. 15, 2004.

* cited by examiner

Domain transform an input signal into a plurality of transform coefficients

252

Bit-plane scan the transform coefficients to produce a plurality of bit plane symbols

253

Defining one or more context models for the bit plan symbols

254

Assign, using the defined one or more context models, a respective one or more context values for the bit plane symbols

255

Code each of the bit plane symbols as a function of the one or more corresponding context values to produce a coded output bit stream

CONTEXT-BASED ENCODING AND DECODING OF SIGNALS

BACKGROUND

The present invention relates to systems and methods for coding data, and more particularly to context-based coding systems and methods.

Context based coding technology is based on using a statistical model with finite state, or context, to capture the statistical dependency of the samples generated from a source. In a context based coding system, the probability assignment in coding a given sample depends on its context which is constructed by using information that is already known to both the encoder and the decoder, for example, the historical samples that have already been coded and transmitted. The detailed design of the context is varied in different applications. For example, in text compression, the context of coding a letter can be formed by its preceding letters. In image coding, the probability assignment of coding a given pixel is determined by the value of its adjacent (coded) pixels.

Figure 1:
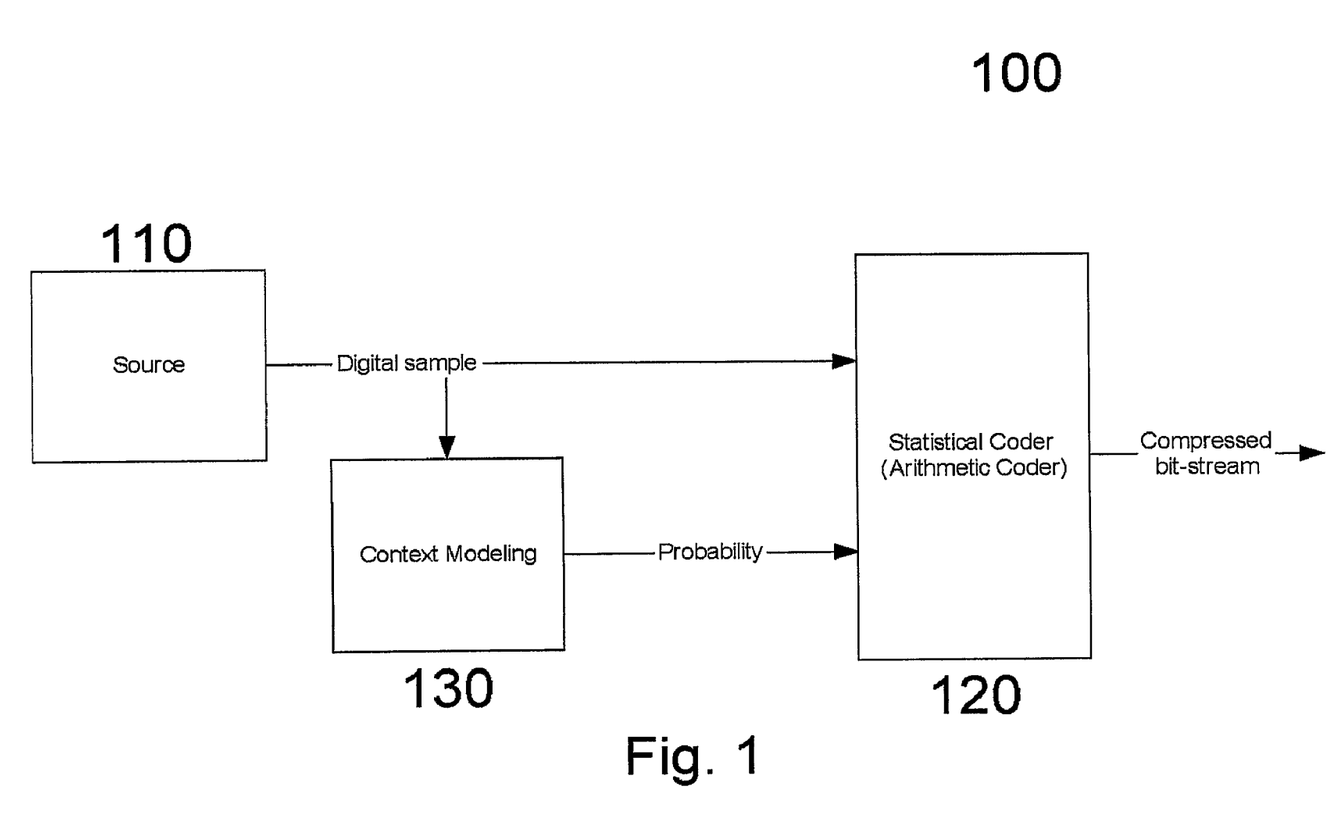
FIG. 1 illustrates a context based coding system as known in the art.

FIG. 1 illustrates a conventional context based coding system known in the art. In the conventional system 100, each sample output from the data source 110 is coded by using a statistical coder 120, usually an arithmetic code, with the probability assignment that are determined by a context modeling module 130. Conventionally the context modeling module used one of two approaches for determining the probability assignment for a given context. The first approach used a fixed frequency table in which each context used a fixed, pre-trained frequency table that recorded the probability assignment for the possible samples, which is then invoked when the context is hit. A second approach used an adaptive frequency table in which the frequency table in each context was adjusted during the coding process according to the samples coded with that context.

The bit-plane coding technology was previously used in image coding, e.g., A. Said and W. A. Pearlman in "A New, Fast, and Efficient Image Codec Based on Set Partitioning in Hierarchical Trees," *IEEE Transactions on Circuits and Systems For Video Technology*, vol. 6, no. 3, pp. 243-250, June 1996. Bit-plane coding has been widely used in multimedia coding application to construct a coding system that achieves fine granular bit-rate scalability. In bit-plane coding, the digital samples to be coded are first grouped into a series of vectors. Each vector is then coded using a sequential bit-plane scanning and coding method where the data elements are coded, sequentially, from the most significant bit (MSB) to the least significant bit (LSB). The context based coding technology can be applied to bit-plane coding in such a way that each bit-plane symbols are coded with probability assignments that are given by a context modeling module according to its context. This leads to the context based bit-plane coding technology (CB-BPC). The CB-BPC technology has been widely used for multimedia coding applications, such as JPEG 2000 [See D. Taubman, "High Performance Scalable Image Compression with EBCOT," *IEEE Tran. Image Processing*, vol. 9, no. 7, pp. 1158-1170, July 2000], and MPEG Audio BSAC [See S. H. Park, Y. B. Kim and Y. S. Seo, "Multi-layer bit-sliced bit-rate scalable audio coder," $103^{rd}$ AES convention preprint 4520, 1997].

What is needed is an improved context-based coding process which provides a better model for the data we are interested in to achieve better compression performance, and which preferably incorporates the scalability of bit-plane coding.

SUMMARY

The present invention provides context-based encoding and decoding systems and processes that incorporate bit-plane coding to allow scalability. Optionally, particular context features, such as frequency band, distance-to-lazy bit-plane plane, significance state and quantization interval of the coefficients and the coding processes may be included to further improve performance.

A context-based encoding system, in one embodiment, includes a domain transform module and a context-based coding module. The domain transform module is operable to convert the input signal into a sequence of transform coefficients $c[i]$. The context-based coding module includes a bit-plane scanning module, and context modeling module, and a statistical encoding module. The bit-plane scanning module is operable to produce a bit-plane symbol $bps[i,bp]$ for each transform coefficient $c[i]$ and each bit-plane $[bp]$. The context modeling module is operable to assign one or more context values to each of the received bit plane symbols bps $[i,bp]$. The statistical coding module is operable to code each of the bit plane symbols bps $[i,bp]$ as a function of one or more of the corresponding context values to produce a context-based encoded symbol stream.

These and other features of the invention will be better understood in view of the following drawings and detailed description which follows.

DETAILED DESCRIPTION

The present invention presents a new context design for the problem of context-based coding of bit-plane symbols of an input digital signal. The design has particular applicability to audio content, but may be used in alternative embodiments for processing image-based data as well as streaming video.

In accordance with the invention, four types of contexts are used separately or in combination with each other to code the input signal. The contexts are referred to herein as the Distance-to-Lazy bit-plane (D2L) context, Frequency Band (FB) context, the Significance State (SS) context and the Quantization Interval (QL). As will be further illustrated below, each bit-plane symbol $b[i,bp]$ of transform coefficient $c[i]$, $i=0, \ldots N-1$, from bit-plane bp is coded with one or more of the D2L, FB, SS, QL contexts, now described below. It is further defined that smaller bp means the least significant bit-plane and that bp is started from 0. Therefore, we have $$c[i] = s[i] \sum_{bp=0}^{M} b[i, bp] 2^{bp}, i = 0 \ldots N-1 \qquad (1)$$

where s[i] and M are respectively the sign and the word length for c[i].

The following context designs are described in terms of an input audio signal, although those skilled in the art will appreciate that minor modifications to these designs may be used to adapt the invention to encode and decode signals containing other forms of content.

Context 1: Frequency Band (FB)

The FB context is assigned to each transform coefficient according to its frequency location, which is used to capture the dependency of the probability distribution of the bit-plane symbols of the transform coefficients to their frequency location. In an exemplary embodiment, the transform coefficients c[i] are classified into three different bands according to its frequency location, namely, Low Band (0~4 kHz), Mid Band (4 kHz~11 kHz) and High Band (above 11 kHz). The FB context for each transform coefficient is then assigned according to each frequency band to which it belongs.

TABLE I

| Context No. | Frequency Range |
| --- | --- |
| 0 (Low Band) | 0~4 kHz |
| 1 (Mid Band) | 4~11 kHz |
| 2 (High Band) | Above 11 kHz |

Of course, it is possible to use different frequency band configuration with different number of context and/or different frequency range classification.

Context 2: Distance-to-Lazy Bit-Plane (D2L)

The second context employed in the present invention describes the relationship of the bit-plane number of the bit-plane symbol to be coded to a pre-determined integer coding parameter lazy_bp. Implementation of this context stems from the observation that the distribution of the bit-plane symbols from audio signal tends to exhibit similar skew of the probability when they have the same distance to the parameter lazy_bp. In the present invention, the D2L context is defined as D2L(bp)=bp−lazy_bp.

Furthermore, it is observed that the probability skew of bit-plane symbols tends to decrease for smaller bp. Therefore, it is possible to simplify the context design by grouping all the D2L contexts with D2L(bp)<L where L is a pre-selected parameter as one context for which bit-plane symbols are coded with equal probability distribution, i.e., probability assignment ½.

In a particular embodiment, the parameter lazy_bp, selected in the CB-BPC encoder for optimal coding performance is sent to the CB-BPC decoder to correctly restore the D2L context for correctly decoding.

Context 3: Significant State (SS)

The significance state context is employed to model the correlation between the amplitude of adjacent transform coefficients for an audio signal. In a particular embodiment, the significance state sig_state(i,bp) is defined as follows:

$$\text{sig\_state}(i, bp) = \begin{cases} 0 & c[i] \text{ is insignificant before } bitplane\ bp \\ 1 & c[i] \text{ is significant before } bitplane\ bp. \end{cases} \qquad (2)$$

where "significant" and "insignificant" means that there exists/doesn't exists non-zero bit-plane symbols b[i, j] with j<bp. The SS context for each bit-plane symbol to be coded is then given by the significant state of its adjacent coefficients. For example, if 4 nearest adjacent coefficients are considered, the SS context for bit-plane symbols b[i,bp] will be given by:

$$SS(i,bp)=\{\text{sig\_state}(i-2,bp),\text{sig\_state}(i-1,bp),\text{sig\_state}(i+1,bp),\text{sig\_state}(i+2,bp)\} \qquad (3)$$

Context 4: Quantization Interval (QI)

Several coding system architectures incorporate a core encoder, such as the Advanced Audio Zip [See R. Yu, X. Lin, S. Rahardja and C. C. Ko, "A Scalable Lossy to Lossless Audio Coder for MPEG-4 Audio Scalable Lossless Coding," Proc. ICASSP 2004], an FGS of lossless audio coder. In such a system, the core encoder performs the quantization and coding process in the transform coefficients c[i], i=0, ..., N−1 to produce a core bit-stream that represents the basic quality/rate coded unit of the input signal. An error mapping is then used to produce a transform residual signal e[i], i=0, ..., N−1, by removing the information that has already been coded in the core bit-stream. This residual signal is finally coded with the CB-BPAC coding process to produce the FGS bit-stream. An exemplary embodiment of this architecture is shown and described in FIG. 3A below.

As the residual signal e[i], i=0, ..., N−1 is generated as a residual from the quantization operation performed on the c[i], i=0, ..., N−1, its amplitude is usually bounded by a value that depends on the quantization interval of the core encoder quantizer. That is:

$$|e[i]| \leq \text{interval}[i], \qquad (4)$$

where the interval[i] depends on the quantization interval for c[i] and the detailed error mapping process employed. For example, if uniform quantizer with quantization interval Δ is used, and the residual signal is constructed by subtracting c[i] to the mid-value of the quantization interval, we have interval[i]=Δ/2.

In order to make use of this property to improve the coding performance, a quantization interval context QI is also made available for embodiments utilizing a core encoder, the quantization interval context given by:

$$QI(i, bp) = \begin{cases} 0, & |\hat{e}[i]| + 2^{bp+1} \leq \text{interval}[i] \\ 1, & |\hat{e}[i]| + 2^{bp} \leq \text{interval}[i] < |\hat{e}[i]| + 2^{bp+1} \\ 2, & \text{interval}[i] < |\hat{e}[i]| + 2^{bp} \end{cases} \qquad (5)$$

where ẽ[i] is the partial reconstructed value for e[i] with all the bit-plane symbols received before b[i,bp].

From Eq. (4) it is straightforward to conclude that when QI=2, the current bit-plane symbols b[i,bp] is zero with probability 1, and hence it does not need to be coded (null context). In addition, compared with context QI=0, the probability of the b[i,bp] being 1 will be much less compared with when QI=1 and hence they are treated into two contexts in the invention.

Context-Based Coding Architectures and Methods

Figure 2A:
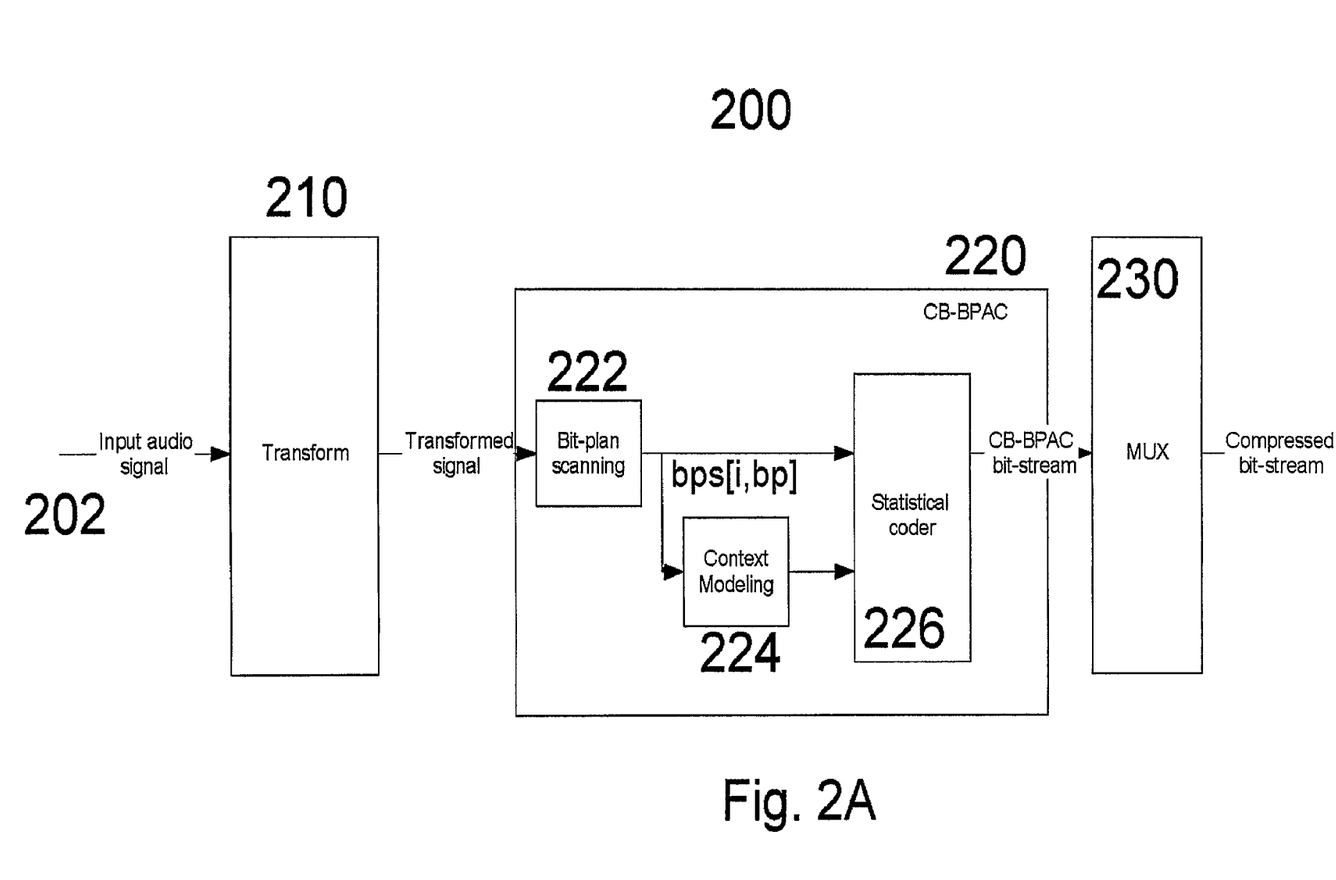
FIGS. 2A and 2B illustrates a first embodiment of a context based encoder and method of operation, respectively, in accordance with the present invention.
Figure 2B:
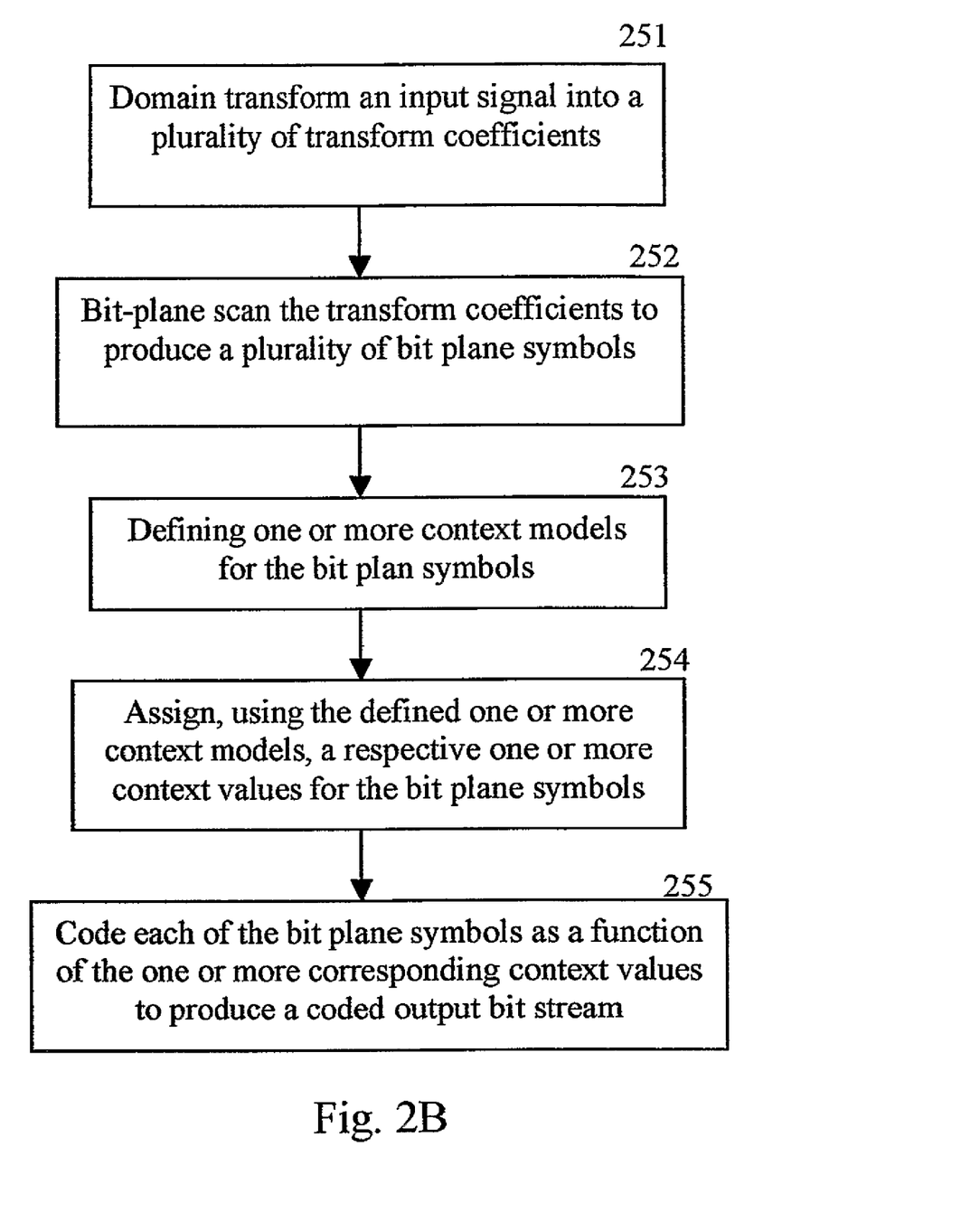

FIG. 2A illustrates an exemplary block diagram of a context-based encoding system used to encode an audio signal, FIG. 2B illustrating the corresponding method of operation. Referring first to the encoder block diagram of FIG. 2A, the encoder 200 includes a transform module 210, a context-based bit-plane arithmetic coder (CB-BPAC) 220, and a multiplexer 230. The context-based encoder 220 further comprises a bit-plane scanning module 222, a context modeling module 224, and a statistical encoder 226, which in an exemplary embodiment is an arithmetic encoder.

Now referring both to FIGS. 2A and 2B to describe the encoder's operation, an audio signal 202 is supplied to the transform module 210 and transformed into transform coefficients c[i], i=0, . . . , N−1 (process 251 in FIG. 2B). In a particular embodiment, the transform module 210 is operable to provide a discrete wavelet transformation to the supplied signal, although other transformations, such as the discrete cosine transformation, discrete Fourier transformation, as well as other transformation types may be used either in alternative embodiments under the present invention.

At 252, the transform coefficients c[i] are subsequently supplied to the bit-plane scanning module, which operates to produce, for each transform coefficient c[i] for each bit plane bp, a bit plane symbol bps[i,bp]. The bit-plane scanning order, in one embodiment, is carried out from the most significant bit-plane to the least one, i.e., from the maximum wordlength M of c[i] to 0.

Bit-plane symbols bps[i,bp] are next supplied to both a context modeling module 224 and a statistical coder 226, the statistical coder comprising an arithmetic coder in the illustrated embodiment. The context modeling module 224 incorporates one or more of the four context models described herein (process 253), and is operable to assign and output, based upon the received bit-plane symbol bps[i,bp], a context value for one or more of the aforementioned context models (process 254). The one or more context values may include a significance state context value computed using previously encoded bit-plane symbols, or a frequency band context value and/or a distance-to-lazy bit-plane context value that is determined by the location of the currently processed bit-plane symbols. In particular embodiments, the context modeling module 224 may be configured to assign and output only one context value to the statistical coder 226, for example a context value corresponding to either the frequency band of transform coefficient, or the distance-to-lazy bit-plane of the currently processed bit-plane symbol bps[i,bp]. In another embodiment, the context modeling module may be configured to assign and output multiple context values for the currently processed bit-plane symbol bps[i,bp], e.g., context values for the frequency band context, distance-to-lazy bit-plane context, and significance state context. Of course, any combination of two of the three context models may also be employed.

At 255, the statistical coder 226 receives and codes the bit-plane symbol bps[i,bp] as a function of the corresponding context value(s) it receives. The resulting context based encoded bit stream is subsequently multiplexed to generate the compressed bit-stream.

Figure 3A:
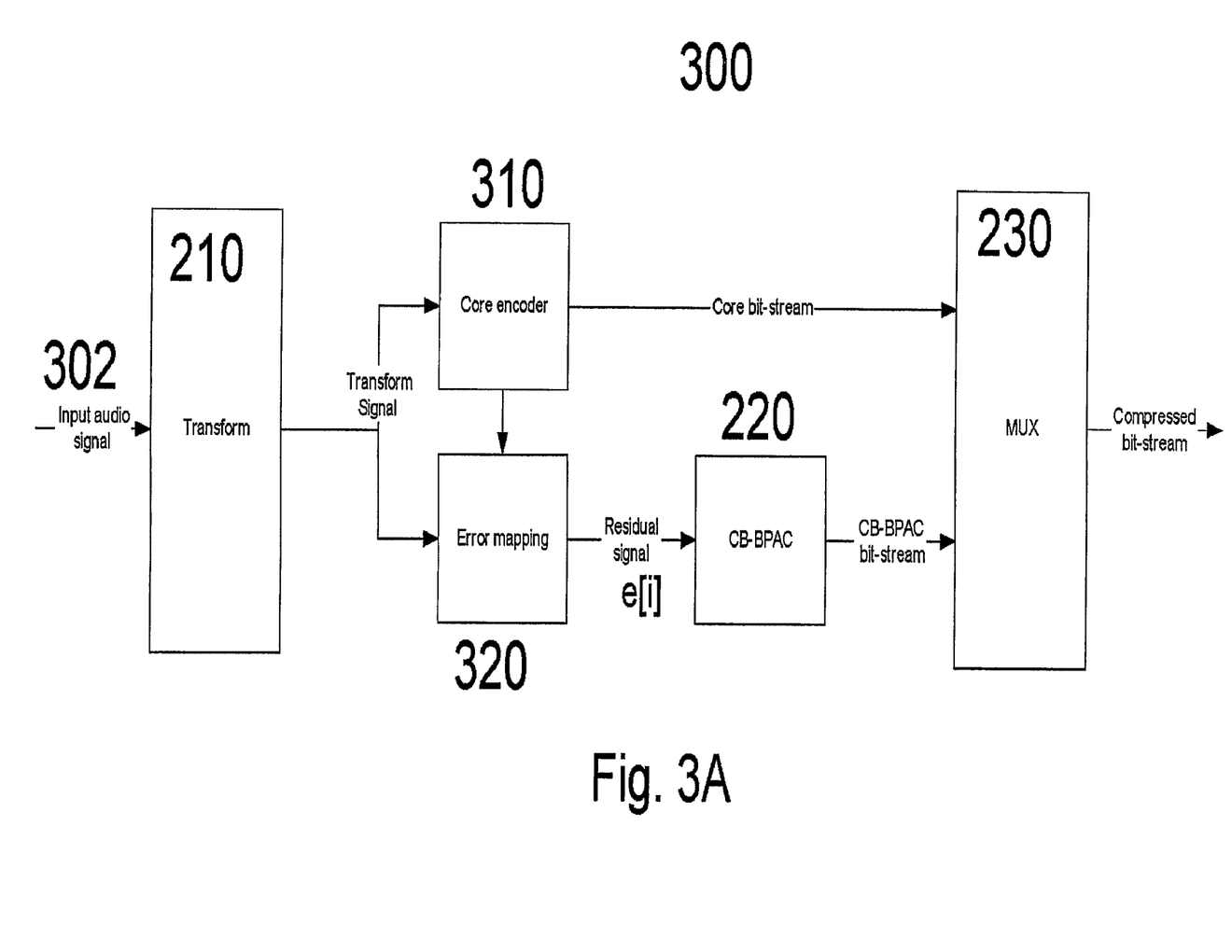
FIGS. 3A and 3B illustrates a second embodiment of a context based encoder and method of operation, respectively, in accordance with the present invention.
Figure 3B:
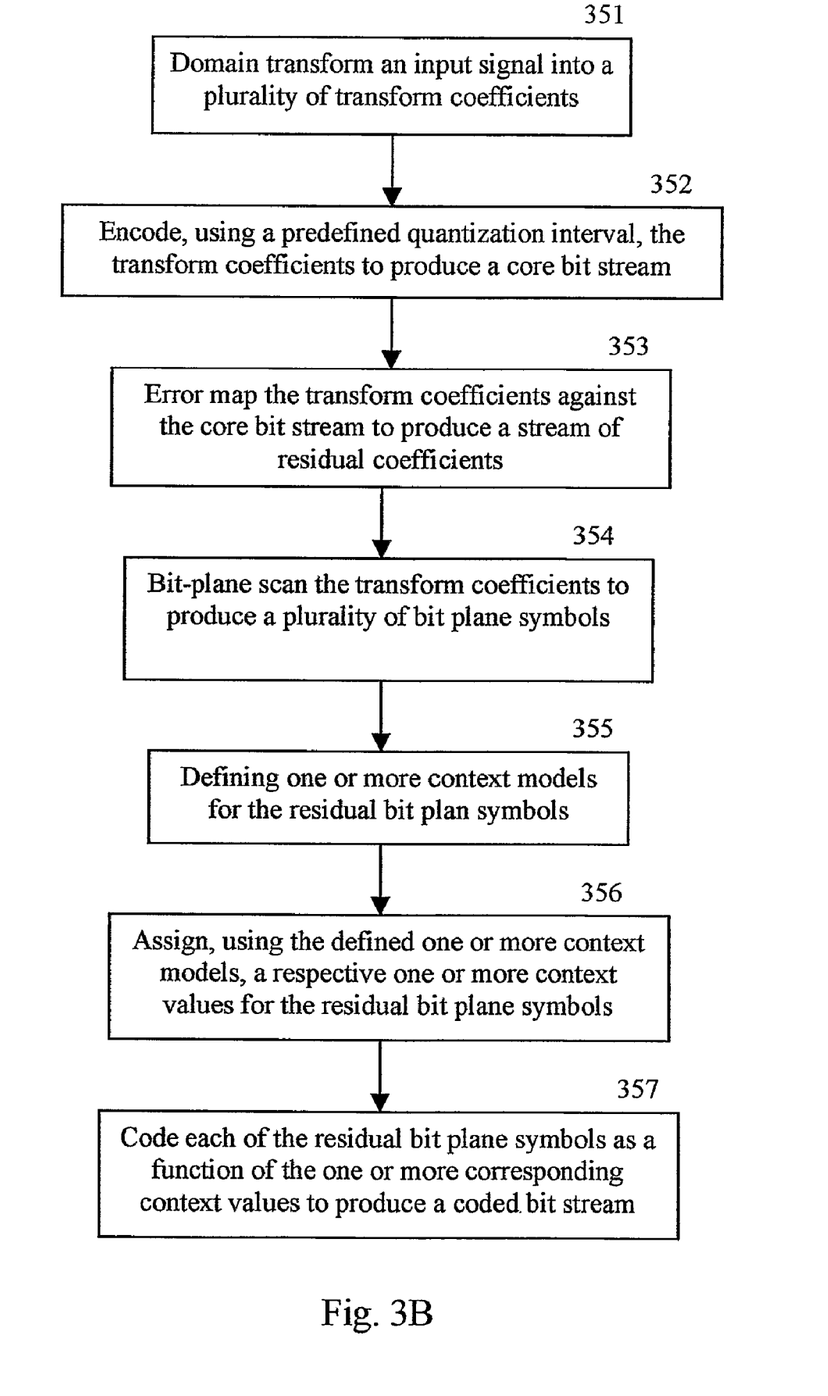

FIG. 3A illustrates a second exemplary block diagram of a context-based encoding system used to encode an audio signal, FIG. 3B illustrating the corresponding method of operation. In addition to the previously identified components, the system 300 further employs a core encoder 310 and an error mapping module 320 for producing a residual signal layer as known in the art.

Referring both to FIGS. 3A and 3B to describe the encoder's operation, audio signal 302 is supplied to the transform module 210 and transformed into transform coefficients c[i], i=0, . . . , N−1 (process 351 in FIG. 3B). As noted above, the transform module 210 may implement any of a variety of time/frequency transforms such as the discrete wavelet transformation, discrete cosine transformation, discrete Fourier transformation, and others.

At 352, the transform coefficients are supplied to the core encoder 310, which operates to encode the transform coefficients into a core bit stream of coefficients x[i] The core encoder 310 encodes the bit stream using a predefined quantization interval, which as described above, is used to determine the QI context in the coding process of the present invention.

Next at 353, the error mapping module 320 receives the sequence of transform coefficients c[i] and the core bit stream, takes the difference therebetween and produces a stream of residual coefficients e[i]. Subsequently, the coding process proceeds in a manner similar as described above whereby the residual coefficients e[i] are context-based encoded by encoder 220. Specifically, within the coding module 220 the residual coefficients e[i] are supplied to the bit-plane scanning module within the coding module 220, which operates to produce, for each residual coefficient e[i] for each bit plane bp, a residual bit plane symbol rbps[i,bp] (process 354). Residual bit-plane symbols rbps[i,bp] are next supplied to both a context modeling module and a statistical coder. The context modeling module incorporates one or more of the four context models described herein (process 355), and is operable to assign and output, based upon the received residual bit-plane symbol rbps[i,bp], a context value for one or more of the aforementioned context models (process 356). The one or more context values may include a significance state context value computed using previously encoded residual bit-plane symbols, or a frequency band context value and/or a distance-to-lazy bit-plane context value that is determined by the location of the currently processed residual bit-plane symbols. Further, the encoding process may include implementation of a quantization interval context model to compute a quantization interval context value. The context modeling module is operable to assign and output context values for each of the four context models (or alternatively, any combination of two or three context models thereof) described herein.

At 357, the statistical coder within coding module 220 receives and codes the residual bit-plane symbol rbps[i,bp] as a function of the corresponding context value(s) it receives. The resulting context-based encoded residual bit stream is subsequently multiplexed with the core bit stream to generate the compressed bit-stream.

Figure 4A:
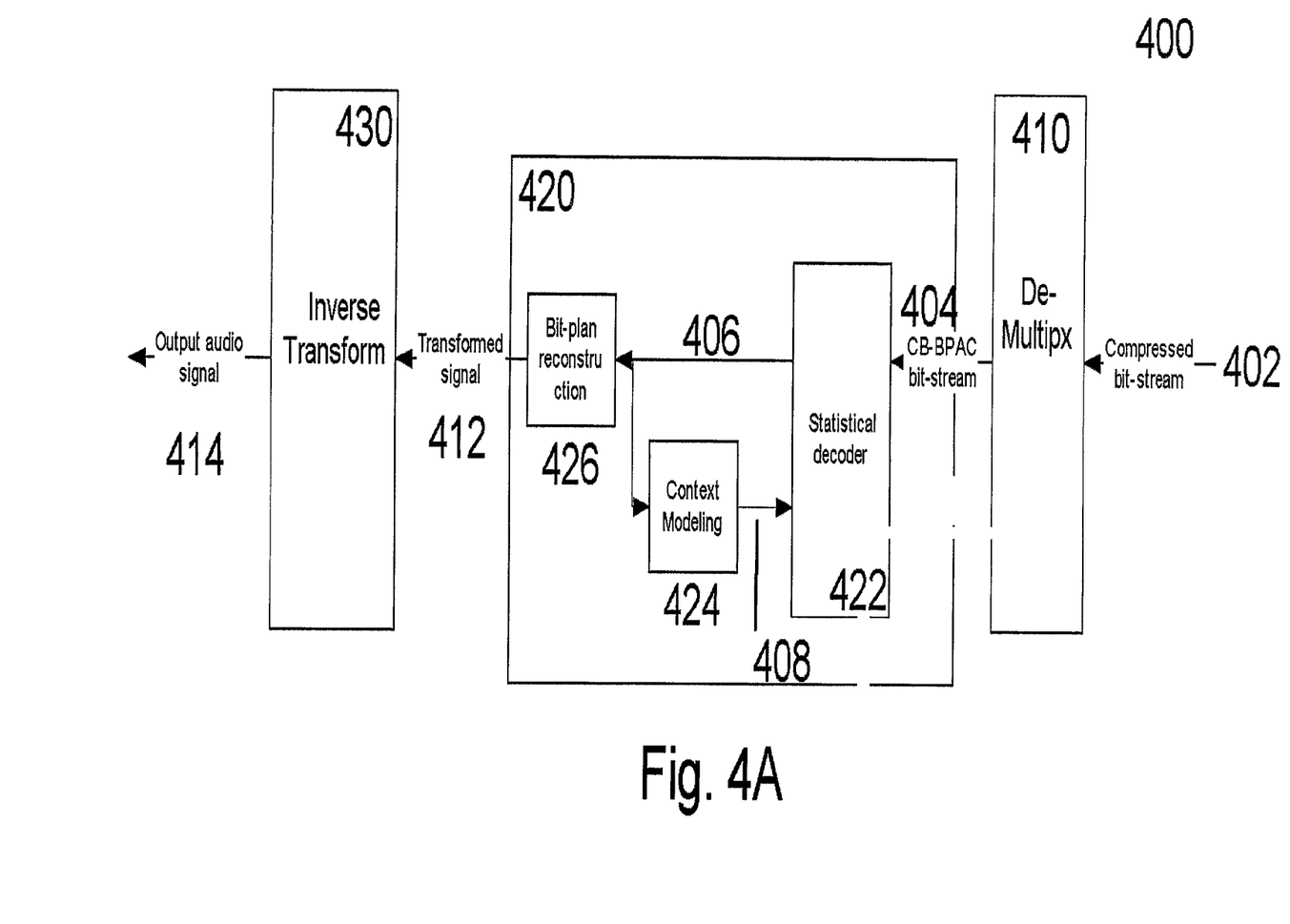
FIGS. 4A and 4B illustrates a first embodiment of a context based decoder and method of operation, respectively, in accordance with the present invention.
Figure 4B:
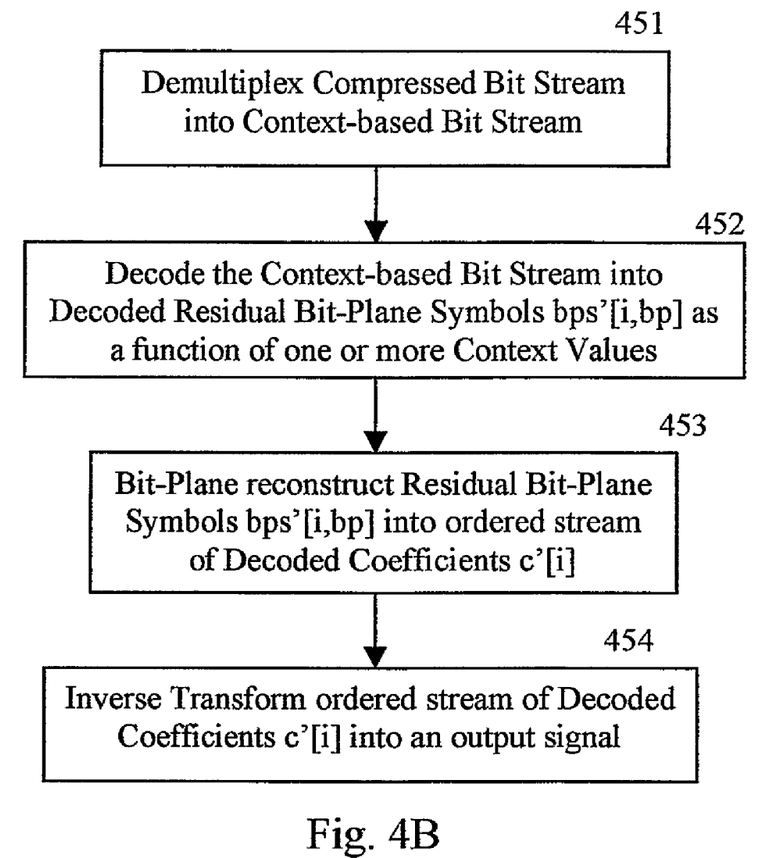

FIGS. 4A and 4B illustrates a context-based decoder and method of operation complementary to the encoder shown in FIGS. 2A and 2B above in accordance with the present invention. Referring first to the decoder block diagram of FIG. 4A, the decoder 400 includes a de-multiplexer 410, a context-based bit-plane arithmetic decoder (CB-BPAD) 420, and an inverse transform module 430. The context-based decoder 420 further comprises a statistical decoder 422, which in an exemplary embodiment is an arithmetic decoder, a context modeling module 424, and a bit-plane reconstruction module 426.

The decoder 400 operates as the inverse of the encoder 200 described above. At 451, a compressed bit stream 402 is received and de-multiplexed into a context-based encoded bit stream 404. At 452, the statistical coder 422 receives the context-based encoded bit stream 404, producing, in response, a stream of decoded bit-plane symbols bps'[i,bp] as a function of the corresponding context value(s). The context value 408 are generated by the context-modeling module 424, which is based on the previously decoded bit-plane symbols bps'[i,bp], such as the significance state context value, and/or based on the location of the currently processed bit-plane symbol such as the frequency band context value and/or distance to lazy-plane context value. In particular embodiments, the context modeling module 424 may be configured to assign and output only one context value to the statistical decoder 422, for example a context value corresponding to either the frequency band of transform coefficient, or the distance-to-lazy bit-plane of the currently processed bit-plane symbol. In another embodiment, the context modeling module may be configured to assign and output multiple context values for the currently processed bit-plane symbol, e.g., context values for the frequency band context, distance-to-lazy bit-plane context, and significance state context. Of course, any combination of two of the three context models may also be employed. It is noted that an apostrophe (') refers to decoded versions of previously identified data (e.g., decoded bit-plane symbols are identified as bps'[i,bp]), the decoded data ideally being an identical copy of the encoded version, but alternatively comprising a version which either includes or omits data due to imperfections in the system's implementation, for example as a result imperfect transmission and/or decoding processes.

At 453, the decoded bit-plane symbols bps'[i bp] are supplied to the bit-plane reconstruction module 426, which produces in response a stream of decoded coefficients 412. Next at 454, the stream of decoded coefficients 412 is input to an inverse transform module 430 operable to inverse transformed to generate a decoded output audio signal 414. The inverse transform module 430 applies the inverse of the domain transformation used in the encoder 200, and may include an inverse discrete wavelet, Fourier, or cosine transforms, or other inverse domain transformations applicable to signal processing.

Figure 5A:
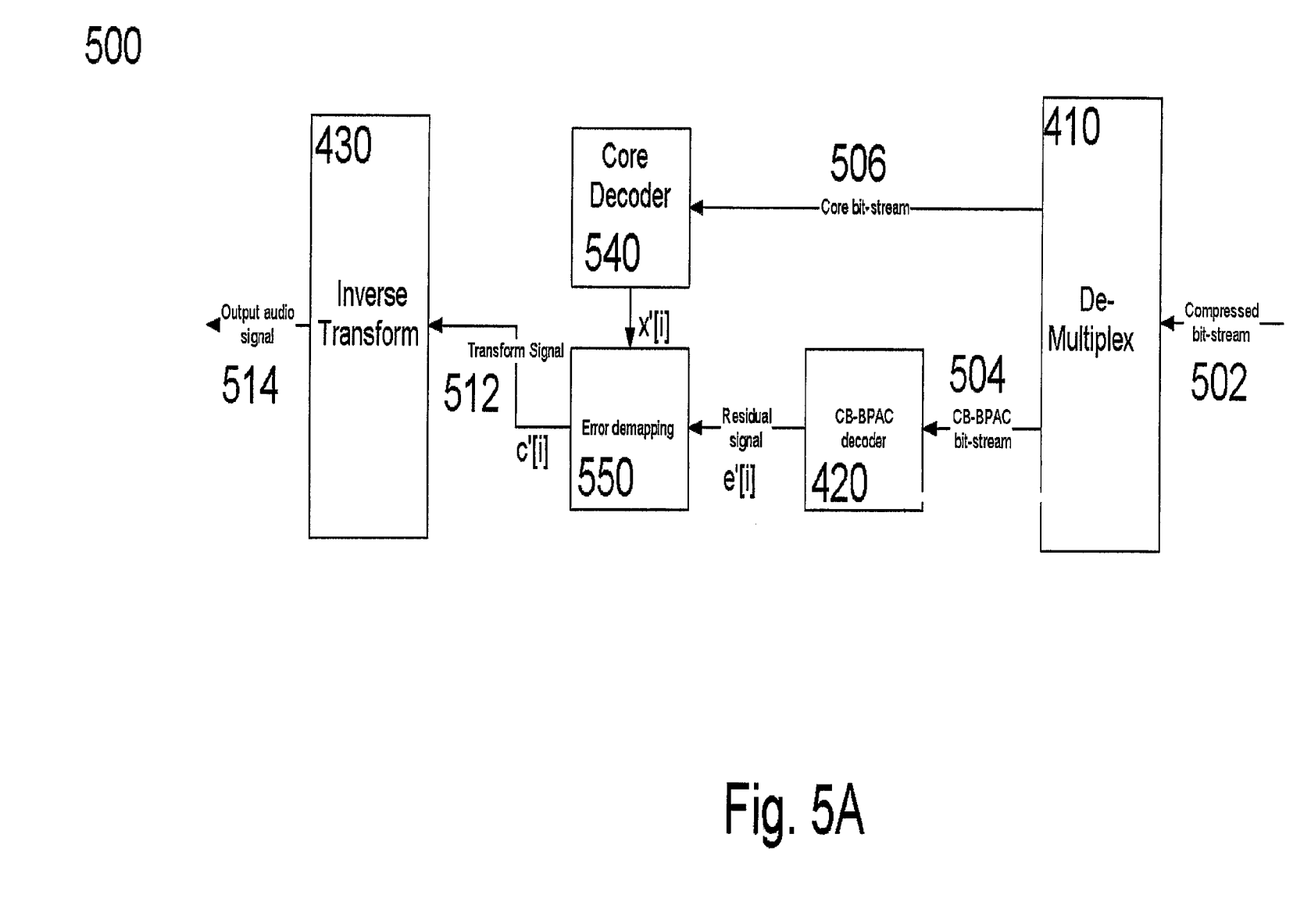
FIGS. 5A and 5B illustrates a second embodiment of a context based decoder and method of operation, respectively, in accordance with the present invention.
Figure 5B:
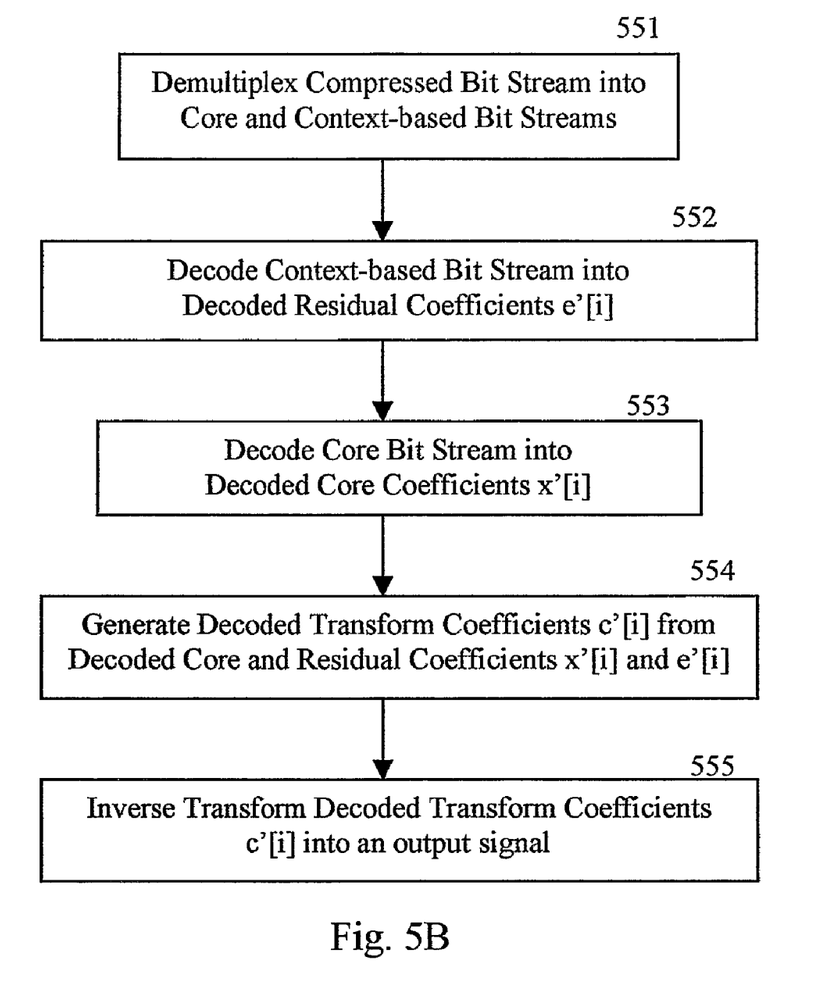

FIGS. 5A and 5B illustrates a context-based decoder and method of operation complementary to the encoder shown in FIGS. 3A and 3B above, with previous features of the decoding system of FIG. 4A retaining their reference indicia. In addition to the previously identified components, the decoder 500 further employs a core decoder 440 and an error demapping module 450.

Referring both to FIGS. 5A and 5B to describe the decoder's operation, initially at 551 a compressed bit-stream 502 is received and demultiplexed into separate context-based encoded residual and core bit streams 504 and 506. At 552, the context-based decoder 420 operates to decode the context-based encoded residual bit stream 504 into a stream of decoded residual coefficients e'[i]. Particularly, the statistical decoder within decoding module 420 receives and decodes the context-based encoded residual bit stream 504 into residual bit-plane symbols rbps'[i,bp] as a function of the context value(s) it receives. The context values used in the decoding process may be a frequency band context value and/or a distance-to-lazy bit-plane context value, each of which is determined from the location of the currently processed bit-plane symbol, a significance state context value which has been computed using previously decoded residual bit-plane symbols. Further, the decoding process may include implementation of the quantization interval context model for computing a quantization interval context value. Any one, two, three or four of the context models and their corresponding context values may be used to decode the residual bit stream 504 into residual bit-plane symbols rbps'[i,bp]. Further specifically, the core decoding module 540 applies the same quantization interval to the decoding process as that applied in the encoding process described above with reference to FIGS. 3A and 3B. The decoded residual bit-plane symbols rbps'[i,bp] are subsequently bit-plane reconstructed into residual error coefficients e'[i].

At 553, the core decoder module 540 receives the core bit stream 506 and generates, in response, decoded core coefficients x'[i]. Next at 554, the error demapping module 550 receives the decoded core and residual coefficients x'[i] and e'[i], and produces, in response corresponding decoded transform coefficients c'[i] 512. Lastly at 555, the stream of decoded transform coefficients c'[i] are input to the inverse transform module 430, which applies the complementary domain transformation to generate the output audio signal 514.

As readily appreciated by those skilled in the art, the described processes may be implemented in hardware, software, firmware or a combination of these implementations as appropriate. Further, some or all of the described processes may be implemented as computer readable instruction code resident on a computer readable medium (removable disk, volatile or non-volatile memory, embedded processors, etc.), the instruction code operable to program a computer of other such programmable device to carry out the intended functions.

INCORPORATED REFERENCES

The following references are herein incorporated by reference in their entirety for all purposes:

Khalid Sayood, Introduction to Data Compression, Ch. 1, pp. 19-21, Morgan Kaufmann, 2000.

A. Said and W. A. Pearlman, "A new, fast, and efficient image codec based on set partitioning in hierarchical trees," IEEE Transactions on Circuits and Systems For Video Technology, vol. 6, no. 3, pp. 243-250, June 1996.

D. Taubman, "High performance scalable image compression with EBCOT," IEEE Tran. Image Processing, vol. 9, no. 7, pp. 1158-1170, July 2000.

S. H. Park, Y. B. Kim and Y. S. Seo, "Multi-layer bit-sliced bit-rate scalable audio coder," 103rd AES convention preprint 4520, 1997.

R. Yu, X. Lin, S. Rahardja and C. C. Ko, "A Scalable Lossy to Lossless Audio Coder for MPEG-4 Audio Scalable Lossless Coding," to be appeared in Proc. ICASSP 2004.

While the above is a detailed description of the present invention, it is only exemplary and various modifications, alterations and equivalents may be employed in various apparti and processes described herein. Accordingly, the scope of the present invention is hereby defined by the metes and bounds of the following claims.

What is claimed is:

1. A context-based encoder, comprising:
   a domain transform module having an input coupled to receive an input signal and an output, the domain transform module operable to convert the input signal into a sequence of transform coefficients c[i]; and
   a context-based coding module, comprising:
      a bit-plane scanning module having an input coupled to receive the sequence of transform coefficients and operable to produce a bit-plane symbol bps[i,bp] for each transform coefficient c[i] and each bit-plane [bp];
      a context modeling module having an input coupled to receive the bit-plane symbols bps [i,bp] and operable to assign one or more context values to each of the received bit plane symbols bps [i,bp], each assigned context value obtained from a context model; and a statistical coding module having a first input coupled to receive each of the bit plane symbols bps [i,bp], a second input coupled to receive the corresponding one or more context values and an output, the statistical coding module operable to code each of the bit plane symbols bps [i,bp] as a function of one or more of the corresponding context values to produce a context-based encoded symbol stream, wherein the one or more context models comprises a distance-to-lazy bit-plane context D2L[bp], the context value of which is determined according to a predefined relationship between the bit plane number [bp] and a predetermined coding parameter [lazy_bp].

2. The context-based encoder of claim 1, wherein the one or more context models comprises a frequency band context FB[i], the context value of which is determined according to the frequency location of the corresponding transform coefficient c[i].

3. The context-based encoder of claim 1, wherein the one or more context models comprises both the frequency band context and the distance-to-lazy bit-plane context, and wherein the statistical coding module is operable to code each of the bit plane symbols bps[i,bp] as a function of the corresponding frequency band context value and the distance-to-lazy bit-plane context value.

4. The context-based encoder of claim 3, wherein the one or more context models further comprises a significance state context sig_state[i,bp], the context value of which is determined according to a predefined correlation in amplitude values for adjacent transform coefficients c[i−1] and c[i] along bit plane [bp].

5. The context-based encoder of claim 4, wherein the statistical coding module is operable to code each of the bit plane symbols bps [i,bp] as a function of the corresponding frequency band context value, the distance-to-lazy bit-plane context value and the significance state context value.

6. The context-based encoder of claim 1, further comprising:
a core encoding module having an input coupled to receive each of the transform coefficients c[i], the core encoder operable quantize at a predefined interval interval[i] and encode each of the transform coefficients c[i] to produce a core bit stream; and
a error mapping module having an first input coupled to receive each of the transform coefficients c[i], a second input coupled to receive the core bit stream, the error mapping module operable to remove the core bit stream from the stream of transform coefficients c[i] to produce a residual signal of coefficients e[i]; and
a multiplexer,
wherein the context-based encoder is operable to receive the residual signal, and to produce, in response, a context-based encoded residual signal, and wherein the multiplexer includes a first input coupled to receive the core bit stream, a second input coupled to receive the context-based encoded residual signal, and an output, the multiplexer operable to combine the core bit stream and the context based encoded residual signal onto a compressed bit stream output from the multiplexer.

7. The context-based encoder of claim 6, wherein the one or more context models further comprises a quantization interval context QI[i,bp], the context value of which is determined as a function of the quantization interval.

8. The context-based encoder of claim 7, wherein the statistical coding module is operable to code each of the bit plane symbols bps [i,bp] as a function of the corresponding frequency band context value, the distance-to-lazy bit-plane context value, the significance state context value, and the quantization interval context value.

9. The context-based encoder of claim 8, wherein the frequency band context value FB[i] comprises:

$$FB[i] = \begin{cases} 0 & \text{For } c[i] < 4\,\text{KHz} \\ 1 & \text{For } c[i]\ 4-11\,\text{KHz} \\ 2 & \text{For } c[i] > 11\,\text{KHz} \end{cases}.$$

10. The context-based encoder of claim 8, wherein the distance-to-lazy bit-plane context value D2L[bp] comprises:

$$D2L(bp)=bp-\text{lazy}\_bp.$$

11. The context-based encoder of claim 8, wherein the significance state context value sig_state[i, bp] comprises:

$$\text{sig\_state}(i, bp) = \begin{cases} 0 & c[i]\ \text{is insignificant before bitplane bp} \\ 1 & c[i]\ \text{is significant before bitplane bp} \end{cases}.$$

12. The context-based encoder of claim 8, wherein the quantization interval context value QI[i, bp] comprises:

$$QI(i, bp) = \begin{cases} 0, & |\hat{e}[i]| + 2^{bp+1} \leq \text{interval}[i] \\ 1, & |\hat{e}[i]| + 2^{bp} \leq \text{interval}[i] < |\hat{e}[i]| + 2^{bp+1} \\ 2, & \text{interval}[i] < |\hat{e}[i]| + 2^{bp} \end{cases}$$

where ê[i] is the partially reconstructed value for e[i] with all the bit-plane symbols received before b[i,bp].

13. A method for the context-based encoding of a signal, the method comprising:
domain transforming an input signal into a plurality of transform coefficients; and
applying context based encoding to the transformed coefficients to produce a coded output bit stream, further comprising:
bit-plane scanning and coding the transform coefficients to produce a plurality of bit plane symbols;
defining one or more context models for the bit plan symbols;
assigning, using the defined one or more context models, a respective one or more context values for the bit plane symbols; and
statistical coding each of the bit plane symbols as a function of the one or more corresponding context values to produce a coded output bit stream,
wherein defining one or more context models comprises defining a distance-to-lazy bit-plane context model, the context value of which is determined according to a predefined relationship between the bit plane number of the corresponding bit plane symbol and a predetermined coding parameter.

14. The method of claim 13, wherein defining one or more context models comprises defining a frequency band context model, the context value of which is determined according to the frequency location of the corresponding transform coefficient.

15. The method of claim 14,
wherein defining one or more context models comprises defining both the frequency band context model and the distance-to-lazy bit-plane context model,
wherein assigning one or more context values comprises assigning a frequency band context value, a distance-to-lazy bit-plane context value to the corresponding bit plane symbol, and
wherein statistical coding each bit plane symbol comprises statistically coding the bit plane symbol as a function of both the frequency band context value and the distance-to-lazy bit-plane context value.

16. The method of claim 15, wherein defining one or more context models comprises defining a significance state context model, the context value of which is determined according to a predefined correlation in amplitude values for adjacent transform coefficients.

17. The method of claim 16,
wherein assigning one or more context values comprises assigning a frequency band context value, a distance-to-lazy bit-plane context value, and a significance state context value to the corresponding bit plane symbol, and
wherein statistical coding each bit plane symbol comprises statistically coding the bit plane symbol as a function of the frequency band context value, the distance-to-lazy bit-plane context value, and the significance state context value.

18. A method for the context-based encoding of a signal, the method comprising:
domain transforming an input signal into a plurality of transform coefficients;
encoding the transform coefficients to produce a core bit stream, the encoding comprising quantizing the transform coefficients at a predefined interval;
error mapping the transform coefficients against the core bit stream to produce a stream of residual coefficients;
applying context-based encoding to the residual coefficient stream to produce a coded residual output bit stream, further comprising:
bit-plane scanning the residual coefficients to produce a plurality of residual bit plane symbols;
defining one or more context models for the residual bit plan symbols;
assigning, using the defined one or more context models, a respective one or more context values for the residual bit plane symbols; and
coding each of the residual bit plane symbols as a function of the one or more corresponding context values to produce a coded output bit stream,
wherein defining one or more context models comprises defining a quantization interval context model, the context value of which is determined as a function of the predefined quantization interval.

19. The method of claim 18, wherein defining one or more context models further comprises:
defining a frequency band context model, the context value of which is determined according to the frequency location of the corresponding transform coefficient;
defining a distance-to-lazy bit-plane context model, the context value of which is determined according to a predefined relationship between the bit plane number of the corresponding bit plane symbol and a predetermined coding parameter; and
defining a significance state context model, the context value of which is determined according to a predefined correlation in amplitude values for adjacent transform coefficients.

20. The method of claim 19,
wherein assigning one or more context values comprises assigning a frequency band context value, a distance-to-lazy bit-plane context value, a significance state context value, and a quantization state context value to the corresponding bit plane symbol, and
wherein statistical coding each bit plane symbol comprises statistically coding the bit plane symbol as a function of the frequency band context value, the distance-to-lazy bit-plane context value, the significance state context value, and the quantization context value.

21. The method of claim 20, wherein the frequency band context value FB[i] comprises:

$$FB[i] = \begin{cases} 0 & \text{For } c[i] < 4\,\text{KHz} \\ 1 & \text{For } c[i]\,4 - 11\,\text{KHz} \\ 2 & \text{For } c[i] > 11\,\text{KHz} \end{cases}.$$

22. The method of claim 20, wherein the distance-to-lazy bit-plane context value D2L[bp] comprises:

$$D2L(bp) = bp - \text{lazy\_}bp.$$

23. The method of claim 20, wherein the significance state context value sig_state[i, bp] comprises:

$$\text{sig\_state}(i, bp) = \begin{cases} 0 & c[i] \text{ is insignificant before } bitplane\ bp \\ 1 & c[i] \text{ is significant before } bitplane\ bp \end{cases}.$$

24. The method of claim 20, wherein the quantization interval context value QI[i, bp] comprises:

$$QI(i, bp) = \begin{cases} 0, & |\hat{e}[i]| + 2^{bp+1} \leq \text{interval}[i] \\ 1, & |\hat{e}[i]| + 2^{bp} \leq \text{interval}[i] < |\hat{e}[i]| + 2^{bp+1} \\ 2, & \text{interval}[i] < |\hat{e}[i]| + 2^{bp} \end{cases}$$

where ê[i] is the partially reconstructed value for e[i] with all the bit-plane symbols received before b[i,bp].

25. A decoder operable to decode a context-based encoded stream comprising an input signal coded as a sequence of domain transformed coefficients c[i] along a bit-plane bp, the decoder comprising:
a context-based decoding module, comprising:
a statistical coding module having a first input coupled to receive a context-based encoded bit stream, a second input coupled to receive one or more context values and an output, the statistical coding module operable to decode, as a function of the one or more context values, the context-based encoded bit stream into decoded bit plane symbols bps'[i,bp], wherein the one or more context values comprises a distance-to-lazy bit-plane context value;
a bit-plane reconstruction module having an input to receive the decoded bit-plane symbols bps'[i,bp] and an output, the bit-plane reconstruction module operable to generate a stream of decoded coefficients c'[i]; and,
an inverse domain transform module having an input coupled to receive ordered stream of decoded coefficients c'[i] and an output, the domain transform module operable to convert the stream of decoded coefficients c'[i] into an output audio signal.

26. The context-based decoder of claim 25, wherein the one or more context values further comprises a frequency band context value.

27. The context-based decoder of claim 25, wherein the one or more context values further comprises a significance state context value.

28. The context-based decoder of claim 27, wherein the one or more context values comprises a frequency band context value, a distance-to-lazy bit-plane context value and a significance state context value.

29. The context-based decoder of claim 25, further comprising:
a demultiplexer, operable to receive a compressed bit stream comprising a context-based encoded residual stream and a core bit stream, the demultiplexer operable to separate and output the context-based encoded residual stream and the core bit stream,
wherein the context-based decoder is operable to receive the context-based encoded residual bit stream, the context-based decoder operable to produce, in response, decoded residual coefficients e'[i];
a core decoding module having an input coupled to a core bit stream, and an output, the core decoding module operable to decode the core bit stream into decoded core coefficients x'[i]; and
a error demapping module having an first input coupled to receive the core coefficients x'[i] and second input coupled to receive the decoded residual coefficients e'[i] and an output, the error demapping module operable to generate, in response, decoded transform coefficients c'[i],
the inverse domain transform module having an input coupled to receive the decoded transform coefficients c'[i] and operable to produce, in response, an output audio signal.

30. The context-based encoder of claim 29, wherein the one or more context values comprises a quantization interval context value.

31. A method for decoding an encoded context-based bit stream, the encoded context-based bit stream comprising an input signal coded as a sequence of domain transformed coefficients c[i] along a bit-plane bp, the method comprising:
statistical decoding, as a function of one or more context values, the encoded context-based bit-stream into decoded bit-plane symbols bps'[i,bp], wherein the one or more context values comprises a distance-to-lazy bit-plane context value;
bit-plane reconstructing the decoded bit-plane symbols bps'[i,bp] into an ordered stream of decoded coefficients c'[i]; and
inverse transforming the ordered stream of decoded coefficients c'[i] into an output signal.

32. The method of claim 31, wherein the one or more context values comprises a frequency band context value.

33. The method of claim 31, wherein the one or more context values comprises a significance state context value.

34. A method for decoding an encoded bit stream comprising a core bit stream and a context-based encoded residual bit stream, the context-based encoded residual bit stream comprising an input signal coded as a sequence of domain transformed coefficients c[i] along a bit-plane bp, the method comprising:
decoding the core bit stream into decoded core coefficients x'[i];
decoding, as a function of one or more context values, the context-based encoded residual bit stream into decoded residual coefficients e'[i], the one or more context values comprising a distance-to-lazy bit-plane context value;
generating, for the decoded core coefficients x'[i] and decoded residual coefficients e[i], decoded transform coefficients c'[i]; and
inverse transforming the decoded coefficients c'[i] into an output signal.

35. The method of claim 34, wherein the one or more context values comprises a frequency band context value.

36. The method of claim 34, wherein the one or more context values includes a quantization interval context value.

37. The method of claim 34, wherein decoding the context-based encoded residual bit stream comprises:
statistical decoding, as a function of the one or more context values, the context-based encoded residual bit-stream into decoded residual bit-plane symbols rbps'[i, bp];
bit-plane reconstructing the decoded residual bit-plane symbols rbps'[i,bp] into decoded residual coefficients e'[i].

38. A computer program product, resident of a computer-readable medium, which is operable to execute instruction code for the context-based encoding of data, the computer program product comprising:
instruction code to domain transform an input signal into a plurality of transform coefficients; and
instruction code to apply context-based encoding to the transformed coefficients to produce a coded output bit stream, further comprising:
instruction code to bit-plane scan and code the transform coefficients to produce a plurality of bit plane symbols;
instruction code to define one or more context models for the bit plan symbols;
instruction code to assign, using the defined one or more context models, a respective one or more context values for the bit plane symbols; and
instruction code to statistical code each of the bit plane symbols as a function of the one or more corresponding context values to produce a coded output bit stream,
wherein instruction code to define one or more context models comprises instruction code to define a distance-to-lazy bit-plane context model, the context value of which is determined according to a predefined relationship between the bit plane number of the corresponding bit plane symbol and a predetermined coding parameter.

39. The computer program product of claim 38, wherein the instruction code to define one or more context models comprises instruction code to define a frequency band context model, the context value of which is determined according to the frequency location of the corresponding transform coefficient.

40. A computer program product, resident of a computer-readable medium, which is operable to execute instruction code for the context-based encoding of data, the computer program product comprising:
instruction code to domain transform an input signal into a plurality of transform coefficients;
instruction code to encode the transform coefficients to produce a core bit stream, the encoding comprising quantizing the transform coefficients at a predefined interval;
instruction code to error map the transform coefficients against the core bit stream to produce a stream of residual coefficients;

instruction code to apply context based encoding to the residual coefficient stream to produce a coded residual output bit stream, further comprising:
  instruction code to bit-plane scan and code the residual coefficients to produce a plurality of residual bit plane symbols;
  instruction code to define one or more context models for the residual bit plan symbols;
  instruction code to assign, using the defined one or more context models, a respective one or more context values for the residual bit plane symbols; and
  instruction code to code each of the residual bit plane symbols as a function of the one or more corresponding context values to produce a coded output bit stream,
  wherein instruction code to define one or more context models comprises instruction code to define a quantization interval context model, the context value of which is determined as a function of the predefined quantization interval.

41. A computer program product, resident of a computer-readable medium, which is operable to execute instruction code for decoding a context-based encoded bit stream, the context-based encoded bit stream comprising an input signal coded as a sequence of domain transformed coefficients $c[i]$ along a bit-plane bp, the computer program product comprising:
  instruction code to statistical decode, as a function of one or more context values, the context-based encoded bitstream into decoded bit-plane symbols bps'[i,bp], the one or more context values comprising a distance-to-lazy bit-plane context value;
  instruction code to bit-plane reconstruct the decoded bit-plane symbols bps'[i,bp] into an ordered stream of decoded coefficients $c'[i]$; and
  instruction code to inverse transform the ordered stream of decoded coefficients $c'[i]$ into an output signal.

42. The computer program product of claim 41, wherein the one or more context values comprises a frequency band context value.

43. A computer program product, resident of a computer-readable medium, which is operable to execute instruction code for decoding an encoded bit stream comprising a core bit stream and a context-based encoded residual bit stream, the context-based encoded residual bit stream comprising an input signal coded as a sequence of domain transformed coefficients $c[i]$ along a bit-plane bp, the computer program product comprising:
  instruction code to decode the core bit stream into decoded core coefficients $x'[i]$;
  instruction code to decode, as a function of one or more context values, the context-based residual bit stream into decoded residual coefficients $e'[i]$, the one or more context values comprising a distance-to-lazy bit-plane context value;
  instruction code to generate, for the decoded core coefficients $x'[i]$ and decoded residual coefficients $e[i]$, decoded transform coefficients $c'[i]$; and
  instruction code to inverse transform the decoded coefficients $c'[i]$ into an output signal.

44. The computer program product of claim 43, wherein the one or more context values comprises a frequency band context model.

45. The computer program product of claim 43, wherein the one or more context values includes a predefined quantization interval context value.

* * * * *

UNITED STATES PATENT AND TRADEMARK OFFICE
CERTIFICATE OF CORRECTION

PATENT NO. : 7,656,319 B2  Page 1 of 1
APPLICATION NO. : 11/632486
DATED : February 2, 2010
INVENTOR(S) : Yu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 257 days.

Signed and Sealed this

Thirtieth Day of November, 2010

David J. Kappos
*Director of the United States Patent and Trademark Office*